June 25, 1963     B. L. POLKOSNIK     3,095,033
TRAVERSE ROD FOR DRAPERIES
Filed Sept. 12, 1958     7 Sheets-Sheet 1
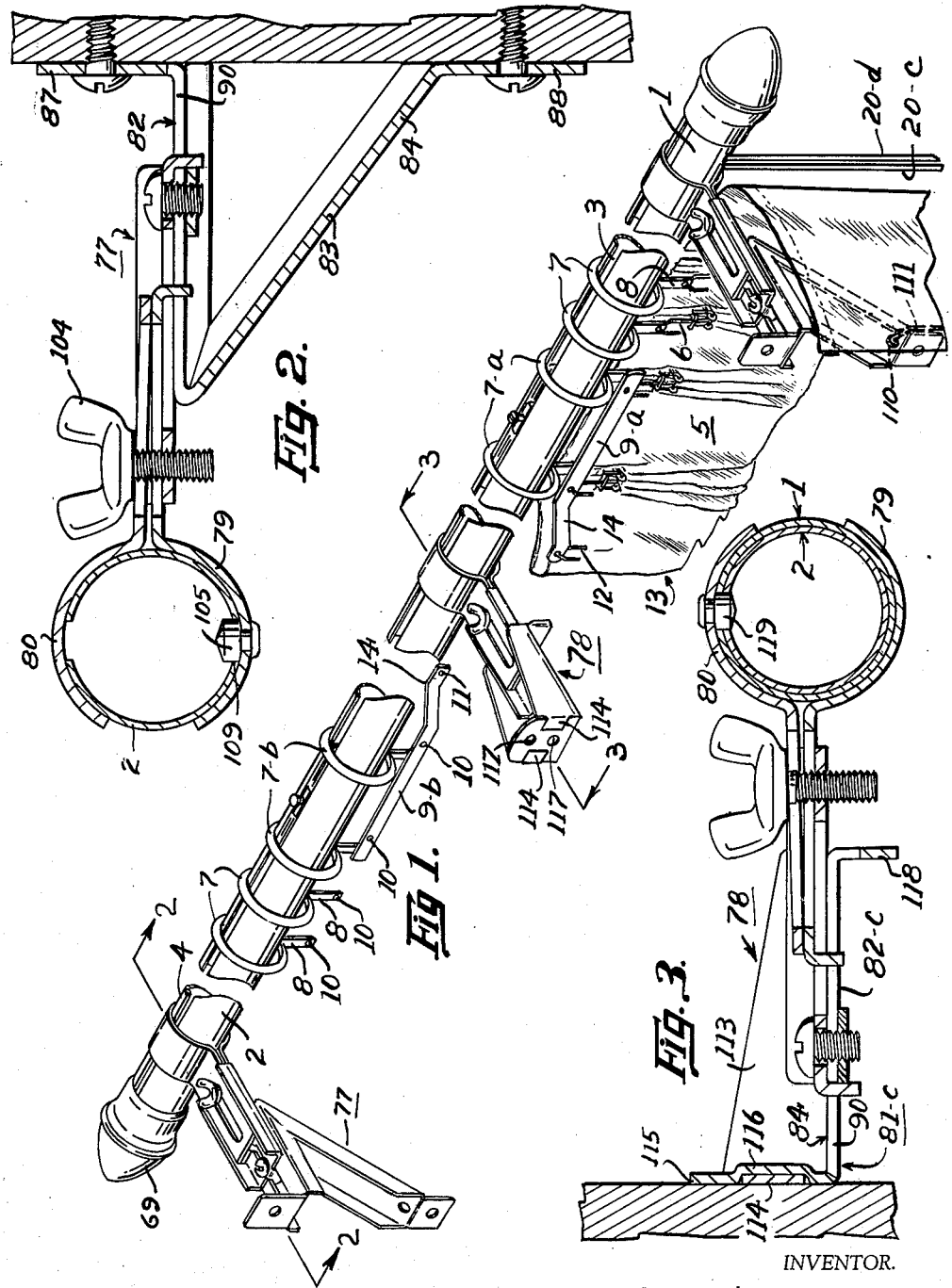
INVENTOR.
BERNARD LEONARD POLKOSNIK.
BY
*Leonard L. Kalish*
ATTORNEY.

June 25, 1963  B. L. POLKOSNIK  3,095,033
TRAVERSE ROD FOR DRAPERIES
Filed Sept. 12, 1958  7 Sheets-Sheet 2
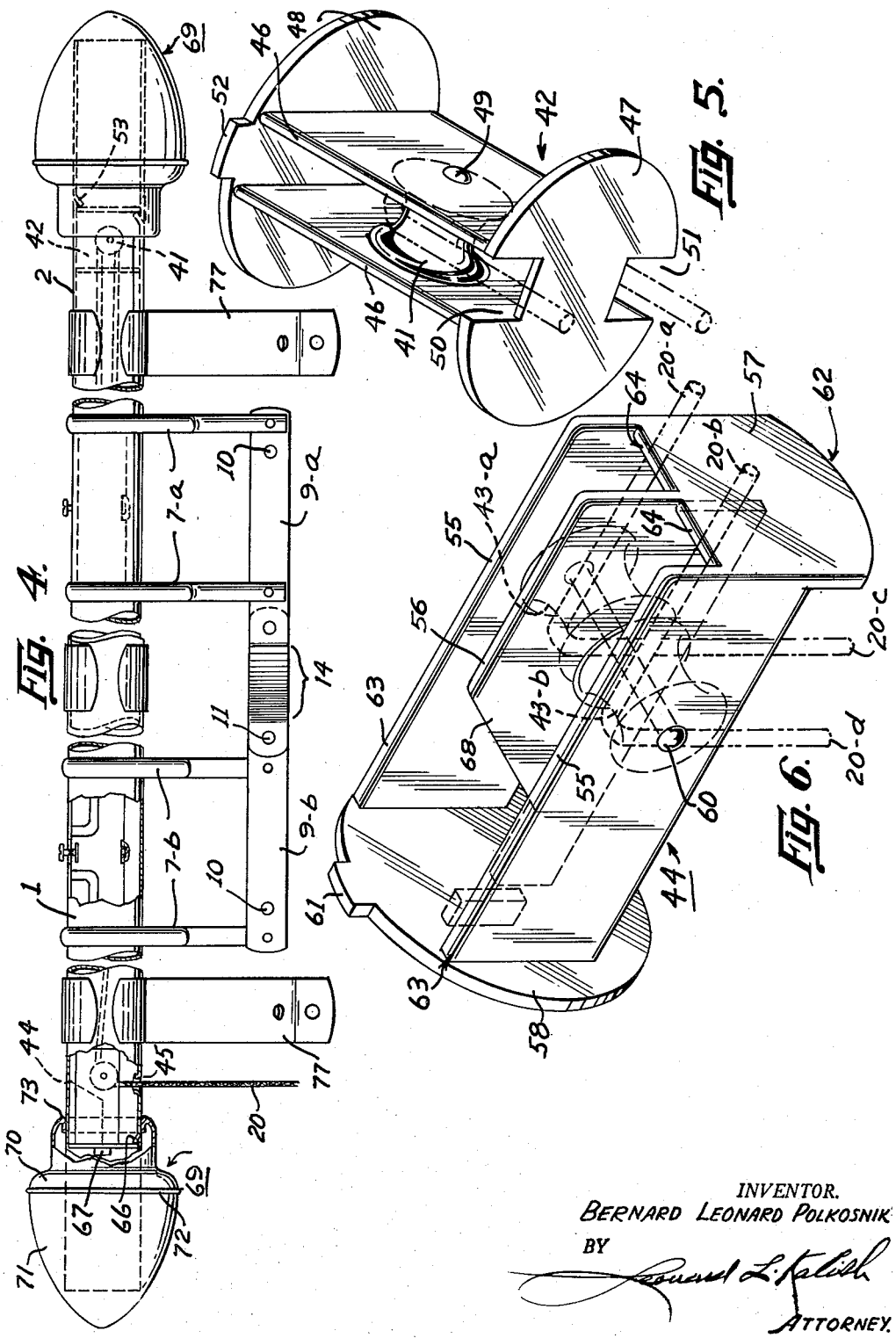
INVENTOR.
BERNARD LEONARD POLKOSNIK
BY
ATTORNEY.

June 25, 1963   B. L. POLKOSNIK   3,095,033
TRAVERSE ROD FOR DRAPERIES
Filed Sept. 12, 1958   7 Sheets-Sheet 3
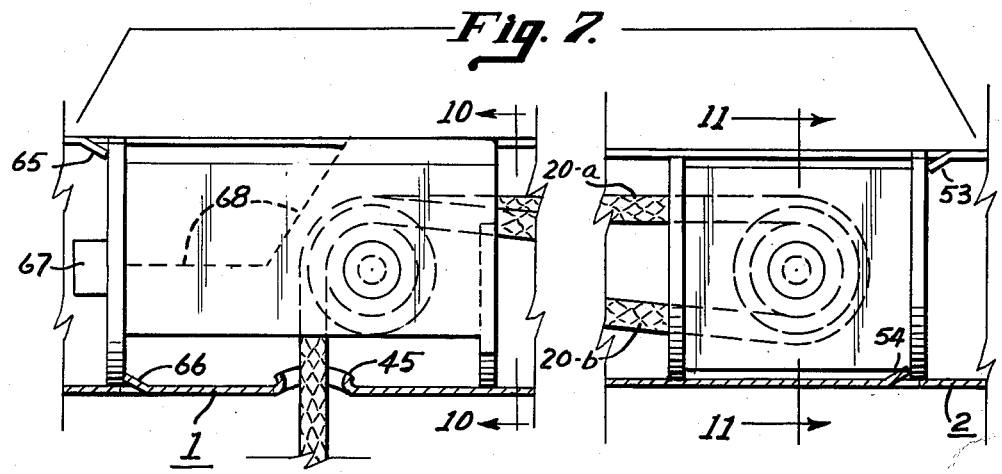
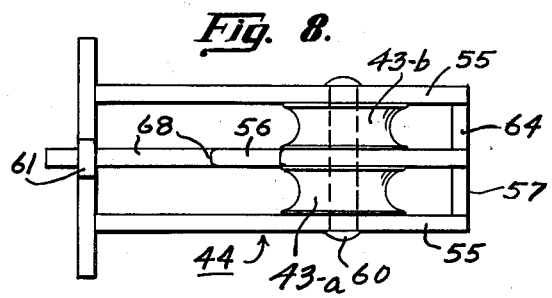
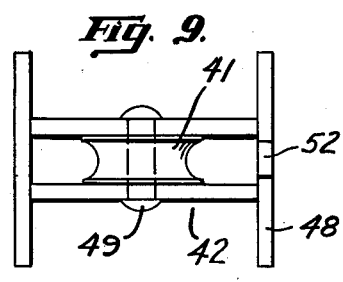
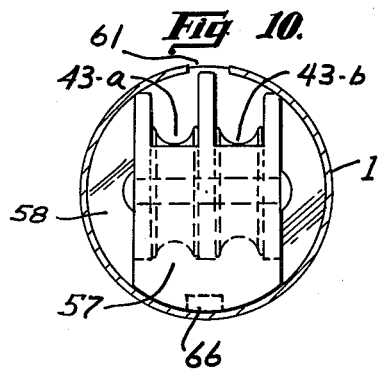
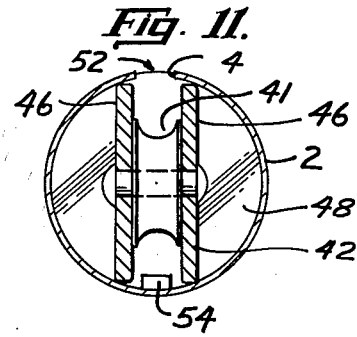
INVENTOR.
BERNARD LEONARD POLKOSNIK
BY
ATTORNEY.

June 25, 1963 B. L. POLKOSNIK 3,095,033
TRAVERSE ROD FOR DRAPERIES
Filed Sept. 12, 1958 7 Sheets-Sheet 4
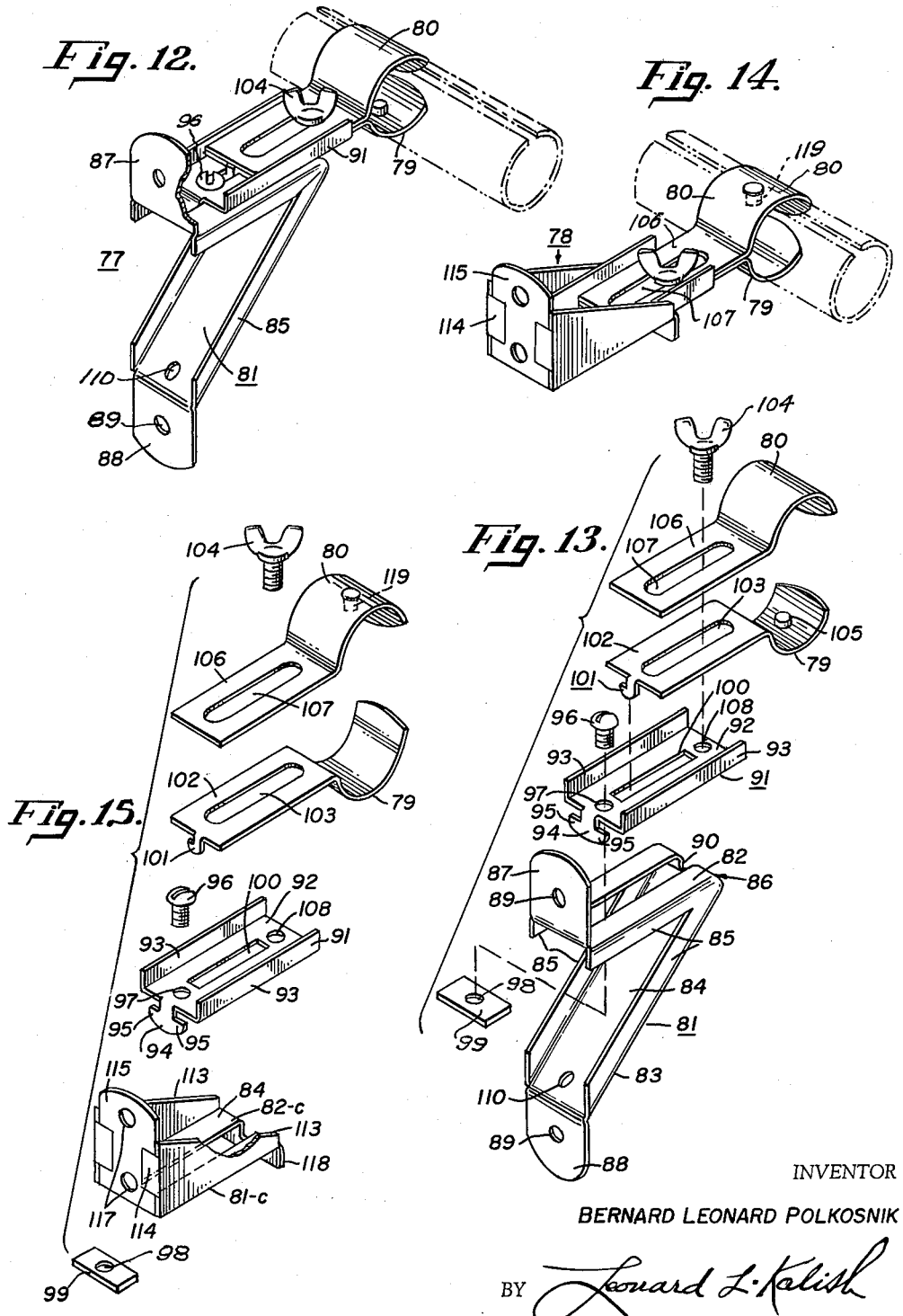
INVENTOR
BERNARD LEONARD POLKOSNIK
BY Leonard L. Kalish
ATTORNEY June 25, 1963   B. L. POLKOSNIK   3,095,033
TRAVERSE ROD FOR DRAPERIES
Filed Sept. 12, 1958   7 Sheets-Sheet 5
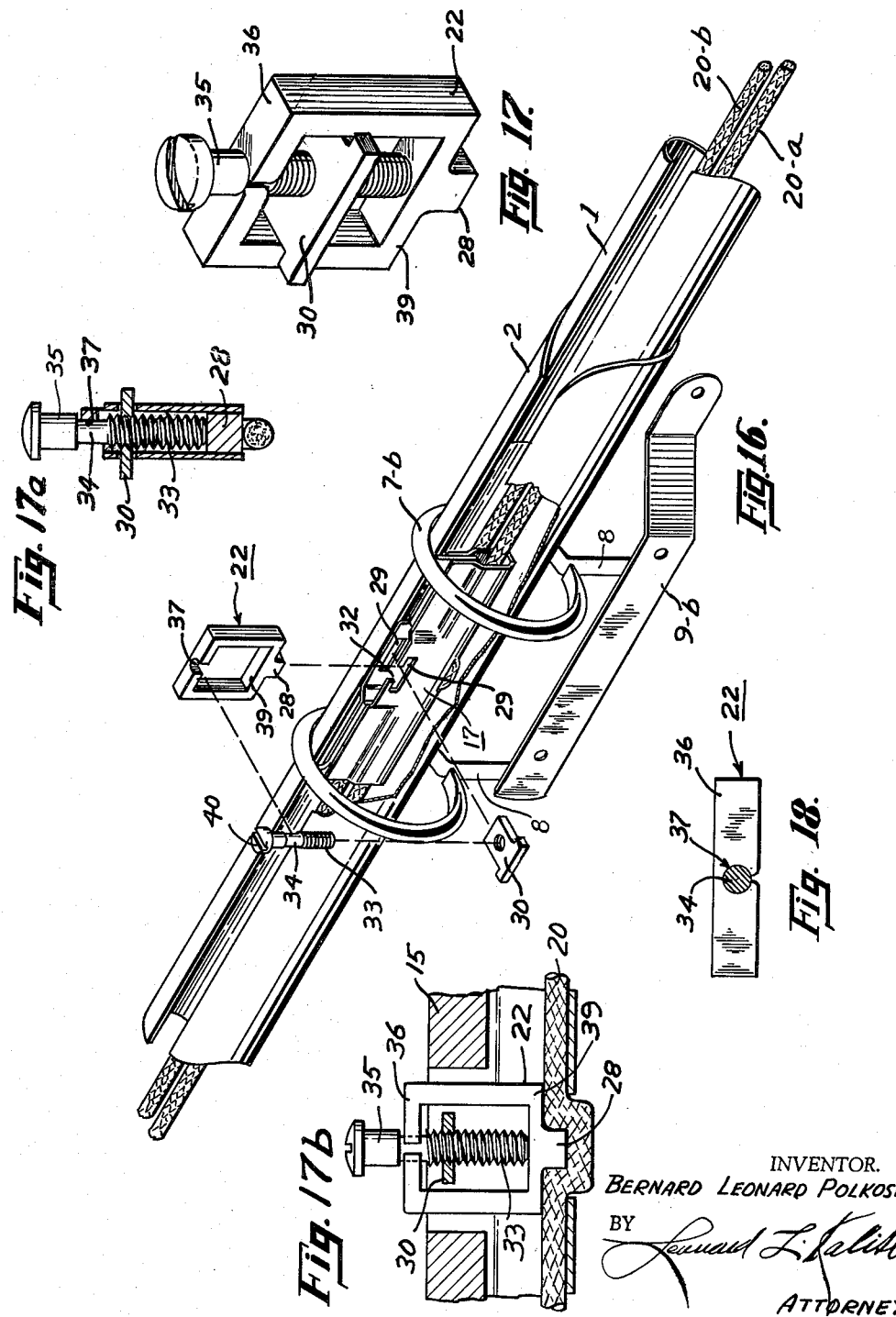
INVENTOR.
BERNARD LEONARD POLKOSNIK
BY
ATTORNEY.

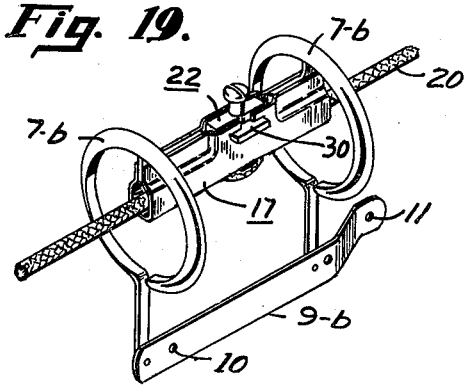
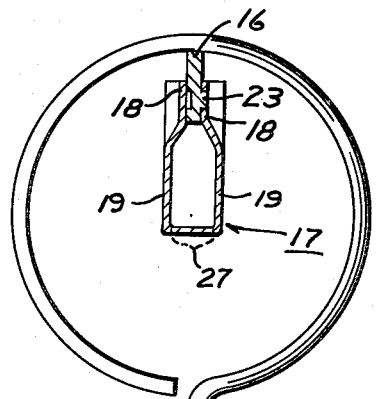
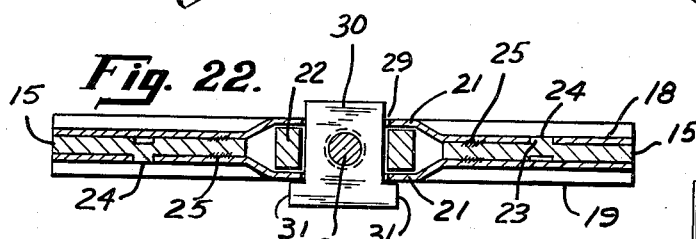
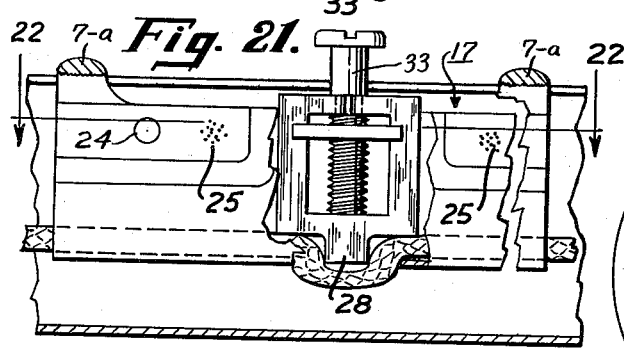
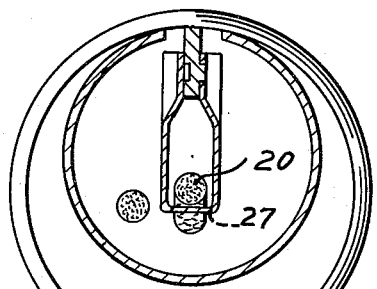
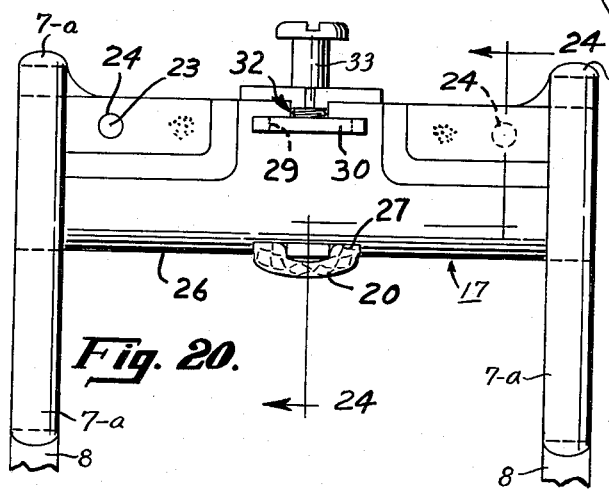
INVENTOR.
BERNARD LEONARD POLKOSNIK.
BY
ATTORNEY.

June 25, 1963 B. L. POLKOSNIK 3,095,033
TRAVERSE ROD FOR DRAPERIES
Filed Sept. 12, 1958 7 Sheets-Sheet 7
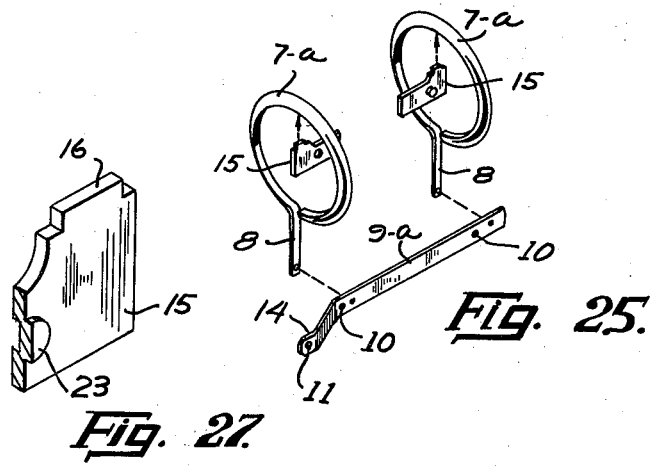
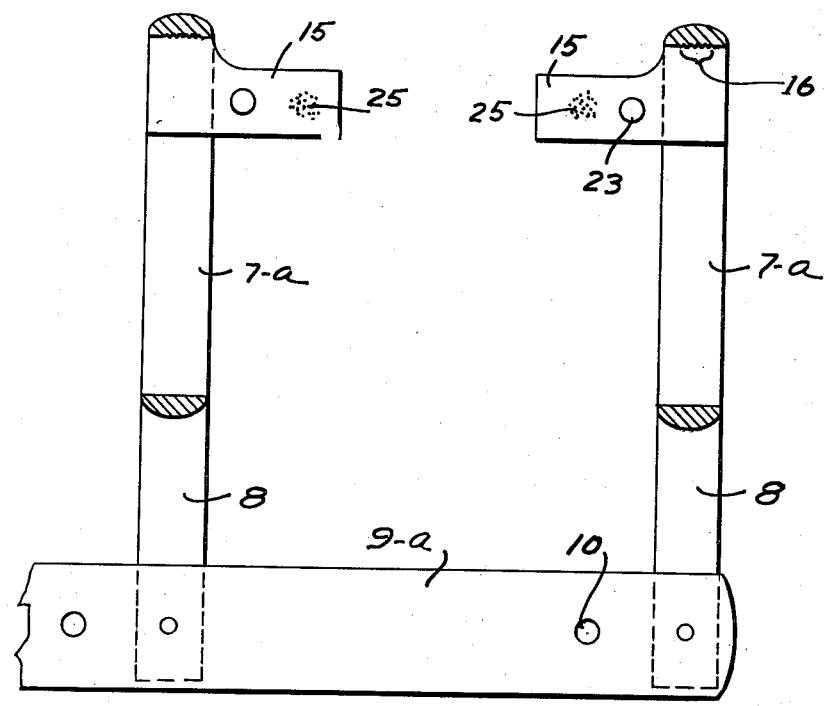
INVENTOR.
BERNARD LEONARD POLKOSNIK
BY
ATTORNEY.

United States Patent Office 3,095,033
Patented June 25, 1963

1

3,095,033
TRAVERSE ROD FOR DRAPERIES
Bernard Leonard Polkosnik, Fairfield, Conn., assignor to Conso Products, Inc., a corporation of New York
Filed Sept. 12, 1958, Ser. No. 760,717
5 Claims. (Cl. 160—345)

The present invention relates to a drapery or curtain traverse-rod, and it relates more particularly to a split tubular traverse-rod, with a slot or gap at the top, and with carrier-rings around the traverse-rod, on which the curtain or drapery may be hung, and having the one or two central-most carriers or "lead" carriers connected to the draw-cords within the tubular rod through a cord-anchorage fixedly connected with such "lead" carrier or carriers and extending down through the gap or slot in the top of the tubular rod and adjustably anchored to the draw-cord.

An object of the present invention is a transverse rod of this type, in which the lead-carriers can be readily adjusted in respect to the draw-cord and securely fastened thereto and also readily released therefrom, and in which the mounting and adjustment of the curtain-rod in respect to the wall (or other supporting surface) may be effected quickly, with maximum security and convenience, and in which the draw-cord may be more effectively guided, and in which the cord-guiding pulleys in the opposite ends of the tubular rod will be readily insertable into and removable from the tube-ends, with minimum cost of construction. A further object of the present invention is a more effective construction which will permit the more efficient manufacture and assembly of the curtain rod.

In the accompanying drawings, in which like reference characters indicate like parts, FIGURE 1 represents a perspective view of a traverse-rod embodying the present invention, viewed from the rear, namely, from the wall-side thereof.

FIGURE 2 represents a cross-section on line 2—2 of FIGURE 1, on an enlarged scale, namely, on a scale approximating full size (with the carrier-rings, the cord-anchorages and the pulley-frame members omitted).

FIGURE 3 represents a similar cross-section on line 3—3 of FIGURE 1.

FIGURE 4 represents a front elevational view of the traverse-rod embodying the present invention, shown partly in sections.

FIGURE 5 represents a perspective view of the single-pulley cord-return pulley-frame member disposed in one end of the traverse-rod, namely, in the end which in FIGURE 4 is on the right-hand side.

FIGURE 6 represents a perspective view of the double-pulley cord-guide pulley-frame member disposed in the other end of the traverse-rod, namely, the end which in FIGURE 4 is on the left-hand side.

FIGURE 7 represents a vertical center section through the two outer end-zones of the traverse-rod, showing the pulley-frame members therein.

FIGURE 8 represents a top plan view of the double pulley-frame member.

FIGURE 9 represents a top plan view of the single pulley-frame member.

FIGURE 10 represents a section on line 10—10 of FIGURE 7, showing the double pulley-frame member, in end elevation, within the tubular rod.

FIGURE 11 represents a section on line 11—11 of FIGURE 7, showing the single pulley-frame member, in end elevation, within the tubular rod.

FIGURE 12 represents a perspective view of one of the two end supporting brackets forming a part of the traverse-rod of the present invention.

FIGURE 13 represents an exploded perspective view of said end bracket.

2

FIGURE 14 is a perspective view of the center bracket forming a part of the traverse-rod of the present invention.

FIGURE 15 is an exploded perspective view of said center bracket.

FIGURE 16 represents a perspective of a fragmentary portion of the traverse-rod, with one of the two cord-anchorages shown therein in an "exploded" view.

FIGURE 17 represents a perspective view of the cord-locking yoke, together with its locking-screw and screw-anchorage plate, in assembled relation to each other; shown on an enlarged scale.

FIGURE 17a represents a transverse vertical cross-sectional view of the cord-locking yoke, screw and screw-anchorage plate shown in FIGURE 17.

FIGURE 17b represents a longitudinal cross-section through the cord-anchorage, through the longitudinal median plane thereof.

FIGURE 18 represents a top plan view of the cord-locking yoke, with the stem of the screw in cross-section, to show the manner in which the notch in the upper cross-bar of the yoke is swaged over said stem, so as revolvably to lock it in place.

FIGURE 19 represents a perspective view of one of the lead-carriers, comprising the two carrier-rings, the cross-bar at the lower pendant arms of the carrier-rings, and the cord-anchorage secured within said rings.

FIGURE 20 is a front elevational view of the cord-anchorage and of the lead carrier-rings forming parts thereof (with the lower portion of the arms and the cross-bar omitted).

FIGURE 21 represents a front elevational view of the cord-anchorage within the traverse-rod, and partly broken away and sectioned.

FIGURE 22 represents a section on line 22—22 of FIGURE 21, of the cord-anchorage.

FIGURE 23 represents a vertical cross-sectional view of the cord-anchorage housing.

FIGURE 24 represents a cross-sectional view on line 24—24 of FIGURE 20.

FIGURE 25 shows an exploded perspective view of one of two "lead" carrier-rings, their lower cross-bar and the connectors thereof (by which the cord-anchorage is secured to the rings).

FIGURE 26 represents a vertical cross-sectional view of the pair of said carrier-rings and their cross-bar and the two connectors (to which the cord-anchorage is secured).

FIGURE 27 represents a perspective view of one of the aforementioned connectors, on an enlarged scale, and partly in section, through the dowel-projection thereof.

The drapery or curtain suspending tubular traverse-rod includes a pair of telescoped split or slotted thin-walled tubes 1 and 2; one having an outer diameter generally the same as the inner diameter of the other, so that it may be telescoped thereinto. In the illustration in FIGURE 4 the tube 2 has the smaller diameter and telescopes into tube 1. (See also FIGURE 3.)

Each of the tubes 1 and 2 has a gap or slot at its top, designated by the numerals 3 and 4, respectively, which preferably extend the entire length of the respective tubes.

The curtain or drapery 5, having any suitable drapery suspending and pleating hooks or "pleaters" 6 at the upper portion or "head" thereof, is suspended from carrier-rings 7 which loosely surround the tubes 1 and 2, and have pendant drapery-suspending extensions or arms 8, with holes 10 at their lower ends, through which the hook portion of any drapery suspension device 6 may be extended, in the manner indicated in FIGURE 1. The drapery suspending device 6 may be of any form of construction, as, for instance, the construction shown in my U.S. Patent 2,796,928, issued June 25, 1957, cited merely for purposes of exemplification.

In FIGURE 1, part of the traverse-rod is broken away (so as to shorten FIGURE 1), but it is to be understood that a carrier-ring 7 is provided for each drapery-suspending device 6.

To each of the two pairs of innermost or "lead" carriers 7a and 7b, a similar lead-bar or cross-bar or member 9a and 9b is secured, in the manner indicated in FIGURES 1, 4, 16 and 19, having hook-receiving holes 10 and 11 therein; the holes 10 being adapted to receive the hook portions of drapery suspending device 6, while the holes 11 being adapted to receive non-pleating drapery-suspension hooks or "end-hooks" or "end-pins" 12, which are pinned or otherwise secured to the inner "lead" edges 13 of the drapery. The hook-receiving holes 11 are in oppositely offset portions 14 of the lead-bars 9, so that the opposite lead-edges 13 of the drapery will overlap each other to a suitable extent, when the drapery is drawn "closed."

The pendant members or arms 8 of the carrier-rings 7a and 7b are secured to the lead-bars 9a and 9b by being electrically spot-welded or projection-welded thereto.

To the inside of each of the two pairs of "lead" carrier-rings 7a and 7b, similar but oppositely facing anchorage-connectors 15 are electrically welded, at points diametrically opposite to the suspension members or arms 8 thereof. The uppermost portions of the connectors 15, which are disposed immediately within the rings, are preferably provided with a weld-projection 16 of the length somewhat less than the width of the ring (FIGURES 25–27), whereby when the welding current is passed through the members (while the projection-weld is pressed against the inside of the ring) in the direction of the arrows (shown in FIGURE 25) the electric fusion or weld will take place in the zone of the weld-projection 16, as indicated in FIGURE 26, so that the outer edges of the ring will not be marred by any welding or "flash" from the welding.

A sheet-metal cord-anchorage housing designated generally by the numeral 17 (FIGURES 16 and 20–24) is formed of a flat sheet of metal folded upon itself, in the manner indicated in FIGURE 22, with its upper end-zones 18 offset inwardly, in the manner indicated in FIGURES 16 and 19–24, so as to bring the upper terminal portions 18 closer together and to place them closely adjacent to the connectors 15, as indicated in FIGURES 22 and 23, while maintaining the lower portions 19 of the side-walls of the cord-anchorage housing spaced apart sufficiently to accommodate the cord 20 with adequate clearance (FIGURE 24); and while leaving the central upper portions 21 of the side-walls of said housing also similarly spaced apart, to accommodate the yoke 22 disposed therebetween.

The connectors 15 have dowel-projections 23 pressed outwardly therefrom, in the manner indicated in FIGURE 27, and the inwardly offset portions 18 of the cord-anchorage housing 17 are provided with matching holes 24, into which the dowels 23 are adapted to extend and in which they are adapted to fit snugly, in the manner indicated in FIGURES 20–24. After they have been welded to the pairs of carrier-rings 7a or 7b in the manner indicated in FIGURES 25 and 26, the opposed pair of connectors 15 are inserted between the juxtaposed pairs of inwardly offset upper terminal portions 18 of the cord-anchorage housing 17, in the manner indicated in FIGURES 22 and 23, and are electrically spot-welded in the weld-spots 25, to both flanking terminal zones 18 of the housing 17, thereby securing the connectors to the housing and securing the two walls of the housing in fixed relation to each other, and (with the aid of the dowels 23 nesting in the holes 24) also securing the connectors and hence the carriers 7a and 7b to the cord anchorage-housing 17.

Through the bottom wall 26 of the cord-anchorage housing 17, an elongated opening 27 is provided, of a length indicated in FIGURES 19 and 21, through which a portion of the cord 20 may be depressed by the downwardly extending locking projection or lock 28 carried at the lower cross-bar 39 or lower end of the yoke 22.

In the central and more widely spaced apart portions of the side-walls 21 of the anchorage-housing 17, horizontal slots 29 are provided, through which the screw-anchorage or screw-nut 30 is extended. The nut 30 has a pair of laterally extending flanges or projections 31 at one end, to limit the inward movement thereof in the slots 29. One of the two slots 29 is also provided with a vertical connecting slot 32, which extends upwardly therefrom, to permit the more ready insertion (and removal) of the locking screw 33 into (and from) the housing 17; particularly to permit the screw 33 to be more readily assembled in the housing 17.

The screw 33 is provided with a reduced-diametered shank portion 34, above the lower screw-threaded portion thereof, to provide a pair of opposed shoulders, one adjacent the upper end of the screw-threaded portion and the other adjacent the lower end of the upper shank 35 thereof; which shoulders are adapted to bear against the upper and lower surfaces of the upper crossbar 36 of the yoke 22, so as to hold the screw to the yoke against axial displacement thereof relative to the yoke, while permitting its rotation with respect to the yoke.

The upper cross-bar 36 of the yoke 22 is provided with a screw-receiving notch 37, whose innermost portion is cylindrical and of a diameter generally the same as the diameter of the reduced-diametered portion 34 of the screw.

The yoke 22, nut 30 and screw 33 are assembled in the anchorage-housing 17 in the manner indicated in FIGURE 16. The yoke 22 is first inserted into the housing 17. Then the screw 33 is threaded into the nut 30, and the nut is slid first through the slot 29 which has the upwardly opening slot 32 connected therewith (through which slot 32 the screw 33 passes) and then through the center of the yoke and into the opposite slot 29, while raising the yoke 22 until the reduced-diametered portion 34 of the screw 33 registers with notch 37 in the upper cross-bar 36 of the yoke. Hence, as the screw 33 passes through the upper slot 32, its reduced-diametered portion or neck portion 34 enters the notch 37. The outer ends of the side-walls of the notch 37 are swaged or otherwise deformed inwardly, towards each other, so as to reduce the opening of the notch to substantially less than the diameter of the portion 34 of the screw 33, in the manner indicated in FIGURES 16 and 18, so as to prevent the screw from coming out of the notch 32, and also to provide more bearing surface between the upper cross-bar 36 of the yoke and the screw. In this manner, the screw prevents the nut from being slid out of the slots 29, and keeps the yoke in place by limiting its upward travel by the engagement of the nut 30 against the lower cross-bar 39. By means of a screw-driver or other flat object (such as a dime), inserted into the screw-slot 40 in the head of the screw 33, the yoke can be moved up and down.

To adjust the span of the cord 20 in relation to the anchorage housing 17, it is only necessary to turn the screw 33 so as to raise the yoke 22 and thereby disengage the lock 28 thereof from the cord; thereby permitting the cord to be straightened by a simple pull thereon and permitting the cord to be slid through the housing 17 in either direction to obtain the proper adjustment of the cord-anchorage on the cord. When the adjustment has been made, namely, when the lead-edge of the curtain has been properly placed in relation to the cord, this screw 33 is again tightened, that is, the screw is turned so as to move the yoke downwardly until it again locks the cord in the cord housing 17.

The cord, designated generally by the numeral 20, has two spans 20a and 20b, between pulley 41 and pulleys 43a and 43b.

The cord 20 is looped around the pulley 41, in the pulley-frame member 42, which is disposed within one of the tubular rod members (as for instance, the tubular rod member 2), near the outer end thereof, as indicated in FIGURE 4.

The two spans 20a and 20b, of the cord 20, extend from the pulley 41, through both tubular rod members, towards the pair of pulleys 43a and 43b in the pulley-frame member 44 mounted in the other tubular rod member, near its outer end, and extend over the pulleys 43a and 43b, respectively, and then downwardly through a registering hole 45 in the lower side of the tubular rod member 1 (FIGURES 4 and 7), and terminate in the pendant portions 20c and 20d, respectively, by which the cord 20 may be pulled to and fro, so as to move the lead-carriers 7a and 7b towards the center or towards the outer ends of the rods, thereby to "close" or "open" the curtain or drapery suspended from the traverse-rod.

The single-pulley housing 42 is formed of a pair of longitudinal pulley-flanking side-walls 46, disposed generally parallel to each other, and a pair of centering or positioning flanges 47 and 48; the side-walls 46 and the flanges 47 and 48 preferably being formed integral with each other, as, for instance, by die-casting them in one piece. Both flanges 47 and 48 have a generally circular outer periphery (as indicated in FIGURES 5 and 11) of a diameter generally the same as the inner diameter of the tubular rod member in which they are mounted, so as to fit and nest therein and to be held in place by the tube wall and, in turn, to give internal support to the split tube.

Between the two side-walls 46, the pulley 41 is pivotally mounted upon a pivot-pin 49, which extends through the side-walls and through a central bearing-opening in the pulley; the pin 49 preferably being secured in place by a pre-formed head at one end thereof and by having the other free end riveted over.

Upper and lower cord-clearance notches 50 and 51 are provided in the inner flange 47 (namely, the flange which is nearer the center of a traverse-rod, as indicated in FIGURE 5), through which notches the upper and lower spans 20a and 20b of the cord may extend, in the manner indicated in FIGURE 7.

The outer flange 48 is provided with an upper key-projection 52, extending radially upwardly therefrom, and of an arcuate extent substantially the same as the width of the slot in the top of the tubular rod member, so that when the pulley housing 42 is mounted in the tubular rod member, the key-projection 52 will extend into said slot and key the housing 42 to the tubular rod member, so as to maintain its position therein against turning, and so as to maintain the pulley 41 at all times in the same relative position or orientation to the tube member. The key 52 also serves to space the two edges of the upper tube-slot apart at the desired distance.

A pair of downwardly struck and slightly inclined locking and positioning tongues or detents 53 are formed in the top of the tube 2 in which the pulley-housing 42 is to be mounted, along the edges of the slot 4 in the top of the tube, and a juxtaposed tongue or detent 54 is struck up from the bottom of the tube 2, with its end spaced axially from the end of the detents 53 a distance slightly greater than the thickness of the flange 48 of the pulley-housing 42. When the pulley-housing 42 is inserted into the outer end of the tubular rod member 2, and is pushed inwardly, the inner flange 47 will clear the tongues or detents 53 and 54, because of the notches 50 and 51 therein, and as the pulley-housing 42 is moved further inwardly, the outer flange 48 rides past the pair of inclined tongues or detents 53 (pressing them up until it has passed the detents 53), whereupon the detents 53 spring back into place behind the flange 48, which is then stopped by the lower detent 54. The key 52 of the pulley-housing 42 is positioned in the upper slot 4 of the tube-member 2 (as indicated in FIGURE 11), thereby maintaining the pulley-housing against rotation with respect to the tube-member.

The double pulley-housing 44 is formed of two outer parallel side-walls 55 and an inner parallel wall 56, and the inner and outer flanges 57 and 58; the parallel walls 55 and 56 and the flanges 57 and 58 being formed integrally with each other, in the manner indicated with respect to the pulley-housing 42.

Between the middle wall 56 and each of the outer walls 55, a similar pulley (43a and 43b) is pivotally mounted upon the pivot-pin 60 which is extended through the two outer walls 55 and the center wall 56 and the journal-holes in the pulleys, and is held in place by a pre-formed head at one end and by having its other end riveted over on the other side of the wall 55. The outer flange 58 is provided with a key 61 at its top (similar to the key 52 of the pulley-housing 42), adapted to be disposed within the slot 3 at the top of the tube-member 1, the periphery of the outer flange 58 being generally circular and of a diameter generally equal to the inner diameter of the tube-member 1. The inner flange 57 has a circular peripheral portion 62 coaxial with the periphery of the outer flange 58 and of the same radius. The outer edges or corner-lines 63 of the outer walls 55 lie in the same cylinder as that in which the circular periphery of the outer flange 58 and the circular peripheral portion 62 of the inner flange 57 lie, whereby the bearing of said corner-lines 63 and of the circular peripheral portion 62 against the inner wall of the tube-member 1 will retain the pulley-housing 44 against any radial displacement within the tube-member 1.

The upper edges 64 of the inner flange 57 are somewhat below the horizontal line which is tangent to the smallest diameter of the pulleys 43a and 43b, so that each of the two generally horizontal spans 20a and 20b of the cord 20, which run over the pulleys 59, will clear the top of the flange 57.

A retainer finger or detent 66 is struck upwardly from the bottom of the tube-member 1; being similar to the detent 54 in the tube-member 2. From the top of the tube-member 1, a pair of detents 65, facing the detents 66, are pressed downwardly from the wall of the tube-member, adjacent to the slot 3 at the top thereof. A turn-knob or member 67 is provided on the outer flange 58, extended outwardly therefrom, whereby the pulley-housing 44 may be gripped by means of a pair of pliers or the like. To insert the pulley-member 44 into the outer end of the tube-member 1, the pulley-housing 44 is turned about 90° (more or less) from its position shown in FIGURES 7 and 10 so that the flange 57 may clear the lower detent 66. When the flange 57 has been moved inwardly past the detent 66, the pulley-housing 44 is turned (by means of the knob 67 thereof) back to its position shown in FIGURES 7 and 10, in which position the key 61 thereof enters the slot 13 at the top of the tube-member. This turning is made possible because the tube (being split at its top) is expandable. The pulley-member 44 is then pushed inwardly until the outer flange 58 thereof passes the upper detents 65 and abuts against the lower detent 66, in the manner indicated in FIGURE 7.

The outer end of the central wall 56 is preferably cut away along the lines 68 (FIGURES 6 and 7) so as to permit more ready access in threading the cord-ends 20c and 20d through the spaces between the center wall 56 and the outer walls 55, in order to extend such cord-ends through the opening 45 at the bottom of the tube-member 1.

In this manner, the pulley-housing 42 and 44 and the pulleys (41 and 43) carried thereby, are maintained in proper angular relation to the tube-members (2 and 1) forming parts of the traverse-rod, and are also locked against axial displacement with respect thereto; so that pulling the cord 20 will not dislodge them; all without any screws or other means not integral with either the tube-member or the pulley-housing.

Over the outermost ends of the respective tube-members 1 and 2, namely, the portions generally outwardly of the outer flanges of the pulley-housings (as indicated in FIGURES 1 and 4), similar hollow sheet-metal knobs or finials 69 are mounted. Each of the finials is preferably formed of an inner member 70 and an outer member 71 and an intervening flat annular washer 72 having an inner hole of a diameter substantially the same as the outer diameter of the tubular rod member over which it is to telescope. The juxtaposed annular edge-zones of the members 70 and 71 are flared and folded over each other so as to permanently lock them to each other, by such interfolding, with the washer 72 locked within such interfolded flared marginal portions of the members 70 and 71.

The central tube-receiving opening 73 of the inner member 70 is preferably flared inwardly as indicated in FIGURE 4, with the innermost diameter of the inwardly flared portion being the same as or just slightly less than the outer diameter of the tube-member onto which the knob 69 is to be telescoped, so as to fit snugly thereover and to be frictionally retained thereon. Moreover, the inwardly flared portion may also engage in the recesses (at the top of the tube-member) formed by the pressing of the upper detents (53 and 65) downwardly.

The traverse-rod is supported upon a pair of outer brackets 77 and an inner bracket 78; each composed of four formed sheet-metal elements, two screws and one nut; one of the formed sheet-metal elements (81 and 81c) being stationarily secured to the wall or window or door frame member and the other three formed sheet-metal elements being movable in respect thereto.

The bracket 77 and 78 are provided with horizontal adjustment in two stages, so that the distance between the rod-embracing jaws 79 and 80 thereof, on the one hand, and the wall-abutting flanges (87 and 88 and 115) thereof, on the other hand, may be varied within a substantial range, as, for instance, a range of approximately two inches (2″), with a minimum wall-to-rod distance being (for instance) of the order of two inches (2″), so that the traverse-rod may be mounted close to the wall (or to the upper window-frame member or door-frame member) and so that it may be also mounted outwardly therefrom a substantial extent, as desired or as the conditions require.

Each of the outer brackets 77 includes a stationary wall-supported member 81 (FIGURE 13) having an upper horizontal portion 82 and a lower inclined bracing portion 83, formed integrally with each other and each having a central web 84 and side-flanges 85, and being integrally connected with each other through the central web 84 at the front junction-corner 86. The flanges 85 on the upper horizontal member 82 and on lower inclined member 83 are mitered to each other, so that their mitered ends bear against each other and thus provide additional rigidity between the two members 81 and 82. Upwardly and downwardly extending vertical wall-flanges 87 and 88 are formed in direct continuation of the central webs 84 of the upper and lower members 82 and 83 (in the manner indicated in FIGURES 1, 12 and 13). The wall-flanges 87 and 88 are provided with screw-holes 89 through which suitable screws or other headed fasteners may be extended into the wall or window-frame member or other support to which the brackets 77 are to be secured.

A slot 90 is provided in the central web 84 of the upper bracket-member 82, from the wall-flange 87 thereof to the outer-most end thereof, and extending slightly down into the central web 84 of the lower bracket member 83, as indicated particularly in FIGURES 2 and 13.

A generally channel-like extension member 91, having a central horizontal web portion or bearing plate 92 and vertical side-flanges 93, is slidably mounted on the upper horizontal stationary bracket member 82, in the manner indicated in FIGURES 2, 12 and 13. The extension member 91 is provided at its rear end with a downwardly extending double hook member 94, in the nature of an inverted T, whose laterally extending arms 95 engage beneath the central web 84 of the upper stationary horizontal bracket member 82, adjacent the slot 90 therein, in the manner indicated in FIGURES 1, 2, 12 and 13, so as to hold the extension member 91 against tipping forwardly when downward pressure or weight is placed on its outer end. A headed screw 96 extends through a clearance-hole 97 in the central web 92 of the extension member 91 and through the slot 90 in the stationary web 84, and is threaded into the screw-threaded hole 98 in the rectangular nut 99 which is disposed beneath the central web 84 of the upper horizontal bracket member 82 and is nested between the flanges 85 thereof, so that the flanges 85 prevent the nut from turning, while permitting it to slide to and fro longitudinally of said member 82, as the extension member 91 is moved in and out in relation to said stationary member 82. In the embodiment shown, the greater dimension of the nut 99 lies transversely of the horizontal bracket member 82, with the short edges of the nut guided by the flanges 85.

By tightening the screw 96, the extension 91 is locked in any desired position, within its limit of travel.

The central web 92 of the extension 91 is provided with a longitudinal slot 100, which is preferably somewhat narrower than the slot 90 in the stationary horizontal bracket member 82, so that the edges of said slot 100 (or at least so that one of the edges of said slot 100) is spaced substantially inwardly from the corresponding edge of the slot 90, thereby to provide a marginal zone beneath the central web 92 of the extension 91, adjacent the slot 90 therein, where the hook 101 (extending downwardly from the rear end of the second extension member 102) may interlockingly engage, thereby to interlock the second extension member 102 with the first extension member 91, while permitting the longitudinal movement of one with respect to the other.

The second extension member 102 nests within the side-flanges 93 of the first extension member 91, and is slidable therebetween and is guided thereby.

By turning the extension member 102 at an angle to the extension member 91, the hook 101 may be inserted into the slot 100, and then by turning the extension member 102 parallel with the member 91 and fitting it between the flanges 93 thereof, the hook 101 will engage beneath the central web 92 of the first extension member 91, in the marginal zone thereof adjacent the slot 100 therein; the neck of the hook 101 bearing against the opposite edge of the slot, thereby preventing the hook from unhooking while the two extension members (102 and 91) are nested. The lateral guidance of the member 102 by the flanges 93 of the extension member 91, likewise prevents the hook 101 from unhooking while the two extension members (102 and 91) are in nested relation to each other in the manner indicated in FIGURE 12 and FIGURE 2.

The second extension member 102 is provided with a longitudinal slot 103 of a width sufficient to clear the outer diameter of the threaded wing-headed screw 104. From and in direct continuation of the front end of the second extension member 102 (and integral therewith), the lower tube-embracing jaw 79 extends, having in the center thereof an upwardly extending dowel-pin or stud 105, secured thereto by riveting, in the manner indicated in FIGURE 2.

The upper plate 106 is similar to the second extension member 102, and is superimposed on the latter, and carries the upper tube-embracing jaw 80 formed integrally therewith and in direct continuation thereof. The upper plate 106 is provided with a slot 107 similar to the slot 103 in the second extension member 102 and of the same length and width. The first extension member 91 is provided with a screw-threaded hole 108 in the front end of the central web 92 thereof, adapted screw-threadedly to receive the winged-screw 104, thereby the central web 92 of the first extension member 91 serves as a nut for the screw 104.

The second extension member 102, having been nested in the first extension member 91, the upper plate 106 is placed thereover, also nested within the flanges 93 of the first extension member 91, and the wing screw 104 extended through the slots 107 and 103 and threaded into the hole 108.

The central bracket 78 is similar to the end brackets 77, in all respects, except that its stationary member 81c does not have the downwardly extending inclined bracing member 83, but only the horizontal upper member 82c, which is similar to the horizontal stationary member 82 of the end bracket 77, but has its side-flanges 113 extending upwardly and terminating in rear tabs 114, which extend behind the upper wall-flange 115 thereon and are preferably nested within outwardly pressed recesses 116 in said wall-flange 115, in the manner indicated in FIGURES 2 and 3. The wall-flange 115 is preferably provided with two holes 117, one above the other, for the reception of headed screws or other fasteners to be extended into the wall or upper door-frame or window-frame member, for securing the bracket 78. The front end of the central web 84 of the bracket 78 has a downturned flange 118, to give the bracket rigidity and also to connect the two halves of the central web 84 to each other on opposite sides of the slot 90 in said central web.

The lower jaw 79 of the central bracket 78 is not provided with an aligning dowel-pin 105, as in the outer brackets 77. Instead, the upper jaw 80 of the center bracket 78 is provided with a similar inwardly extending upper dowel-pin or stud 119, which extends into both slots 3 and 4 of the two tubular rod members 1 and 2, in the zone where they (and hence their slots) overlap each other, in the manner indicated in FIGURE 3, thereby to keep the slots 3 and 4 in alignment with each other and also to key the two inner overlapped portions of the two tubular members 1 and 2 to the central bracket 78 so as to prevent the rotation of such inner end portions of the tube-members in relation to the bracket. The dowel-pin 119 also serves to prevent the tube from collapsing, namely, to prevent the slots 3 and 4 from being partly collapsed or narrowed, and thereby to prevent the jamming of the cord-anchorages within the slots 1 and 2.

Each of the tubular rod members 1 and 2 is provided with a hole 109 in the lowermost part thereof, near its outer end, into which the dowel pin or stud 105 is adapted to extend, in the manner indicated in FIGURE 2, thereby to prevent the rod members from turning within the brackets 77 and also to prevent them from being moved longitudinally or axially with respect to said brackets.

With the two tubular rod members 1 and 2 being telescoped in relation to each other, and with the cord 20 mounted therein and extending through the two pulley-housings 42 and 44, and with the carrier-rings 7 mounted on the tube-members, and with the two spans 20a and 20b of the cord 20 laced through the cord-anchorage housings 17, the traverse-rod is placed on the lower tube-embracing jaws 79 (of the two outer brackets 77 and of the center bracket 78), with the dowel-pins 105 extending into the holes 109 of the tube members.

In this condition the screws 96 and 104 are loose or partly unscrewed (or can be completely removed, because the hooks 95 and 101 are in and of themselves sufficient to give support to the rod resting on the lower jaws 79). Then the upper plates 106, having the upper jaws 80, are placed over the tube-members and over the second extension member 102, in the manner indicated in FIGURES 2, 12 and 13, and the wing-screw 104 extended through the slots 107 and 103 and threaded into the hole 108.

Thereupon the outward extension of the brackets is adjusted, so as to bring the telescoped tube members 1 and 2 to the proper distance from the wall or window-frame or door-frame, and the screws 96 and 104 are then tightened so as to lock the bracket members to each other in their adjusted position and rigidly to clamp the tube-members between the lower and upper jaws 79 and 80, in the manner indicated in the drawings. The outward extension of the brackets from their minimum dimension to the dimension at which the tube members 1 and 2 are to be held, is preferably divided between the two extensions. Thus, if a one-inch extension is desired from the minimum dimension (or from minimum wall-to-tube dimension), then a half-inch of such total extension is preferably obtained by moving the first extension member 91 outwardly a half-inch in relation to the stationary bracket member 82, and the second half-inch of such total extension is preferably obtained by moving the second extension 102 (with its upper plate 106) outwardly a half-inch with respect to the first extension member 91.

The lower inclined stationary bracket member 83 is preferably provided with a hook-anchorage-hole 110, in its central web 84 (or elsewhere thereon) near the wall-flange 88 thereof. Into this hole 110, the "end-pin" or hook 111 (which is fastened to the outermost portion of the drapery) may be hooked, so as to keep the outermost edge-zones of the curtain or drapery folded rearwardly towards the wall or window frame or door-frame.

Having described the invention, the following is claimed:

1. A traverse rod for draperies, curtains and the like, including a longitudinally split thin-walled tubular rod having a slot of substantial width at the split thereof, a pulley frame member mounted within each of the two outer ends of said tubular rod, interlocking projections pressed inwardly from the wall of said tubular rod for interlocking with and positioning the pulley frame members within said tubular rod and for locking them against axial displacement relative thereto, and a key on each of said pulley frame members extending into said slot, locking it against rotational displacement with respect to said tubular rod and preventing the narrowing of said slot.

2. A traverse rod for draperies, curtains and the like, including a longitudinally split thin-walled tubular rod having a slot of substantial width at the split thereof, a pulley frame member mounted within each of the two outer ends of said tubular rod, having a positioning flange positioning it radially within said tubular rod and preventing the collapsing of said rod, interlocking projections pressed inwardly from the wall of said tubular rod for interlocking with said flanges and positioning the pulley frame members within said tubular rod and for locking them against axial displacement relative thereto, and a key on each of said pulley frame members extending into said slot, locking it against rotational displacement with respect to said tubular rod.

3. In a traverse rod for draperies, curtains and the like including a thin-walled split tubular rod whose split provides a gap of substantial width at the top of the rod, a pulley frame member telescoped into an end of said rod and having a pulley therein, said pulley frame member having a centering means comprising bearing-contacts for bearing against the inner wall of the tube for holding it firmly within the tube against any radial displacement therewithin by reason of such bearing contacts between the pulley frame member and the inner wall of the tube, said pulley frame member having a flange, and a detent intermediate said pulley frame member and said tubular rod and integral with one, for interlocking the pulley frame member and said tubular rod with respect to each other against axial displacement of the pulley frame member within the rod, and means intermediate said pulley frame member and said rod, and integral with one, for preventing the rotation of the former with respect to the latter and to prevent the narrowing of the slot at the top of the tube.

4. A traverse rod for draperies, curtains and the like, including a thin-walled split tubular rod having a longitudinal slit in its topmost portion, a pulley frame member in each end of said rod, one of said pulley frame members having a return-pulley therein over which the traverse-cord is looped to form two oppositely movable spans and the other pulley frame member having a pair of pulleys over which the two spans of the cord extend and from which they may extend downwardly to form the manually engageable pull-ends of the cord, ring-like carriers embracing said rod and arranged to ride on the topmost portion thereof, said carriers having means thereon disposed beneath said rod to which the head of the curtain can be detachably secured, and a cord-anchorage rigidly secured to the uppermost portions of the inside of two carriers spaced a short distance from each other, said cord-anchorage extending downwardly from the uppermost portions of said two carriers through the slit at the top of the tube, into the tube, said cord-anchorage having a longitudinal cord-passageway therethrough and having a vertically movable cord-locking element in operative juxtaposition to a wall of said passageway, for clampingly securing the cord to said cord-anchorage, in a releasable manner, between said cord-locking element and said wall of said passageway and means interconnecting the lowermost portions of said two carriers and maintaining them in spaced relation to each other.

5. A traverse rod for draperies, curtains and the like, including a split tubular rod, a pulley frame member in each end of said rod, one of said pulley frame members having a return-pulley therein over which the traverse-cord is looped to form two oppositely movable spans and the other pulley frame member having a pair of pulleys over which the two spans of the cord extend and from which they may extend downwardly to form the manually engageable pull ends of the cord, carrier-rings on said rod having means thereon to which the head of the drapery or curtain can be detachably secured, and a cord-anchorage secured to the inside of two carrier-rings and maintaining them at a predetermined fixed distance from each other and extending downwardly therefrom through the slit at the top of the tube, into the tube, said cord-anchorage having a longitudinal cord-passageway therethrough, the portion of said cord-anchorage which includes said cord-passageway being within said tubular rod, a vertically movable cord-locking element in operative juxtaposition to the bottom wall of said passageway, a recess in the bottom wall of said cord-passageway, disposed beneath and in operative alignment with said cord-locking element, said cord-locking element being arranged to deform the cord in said passageway and to lock the so deformed portion of the cord in said recess, means for guiding said cord-locking element, means extending through said upper slit in the tubular rod for lowering and raising said cord-locking element into and out of locking engagement with the cord.

References Cited in the file of this patent
UNITED STATES PATENTS

| | | |
|---|---|---|
| 203,270 | Herlt | May 7, 1878 |
| 547,341 | Ferg | Oct. 1, 1895 |
| 714,980 | Wegner | Dec. 2, 1902 |
| 852,941 | Fenian | May 7, 1907 |
| 962,361 | Kuhl | June 21, 1910 |
| 1,606,582 | Kirsch | Nov. 9, 1926 |
| 1,855,036 | Vroom | Apr. 19, 1932 |
| 2,341,217 | Holtzclaw | Feb. 8, 1944 |